Patented Feb. 11, 1947

2,415,443

UNITED STATES PATENT OFFICE 2,415,443

STRONTIUM PEROXIDE AND METHOD OF MAKING THE SAME

Mahlon J. Rentschler, Willoughby, Ohio, assignor to Albert Pavlik, Pittsburgh, Pa.

No Drawing. Application November 28, 1944, Serial No. 565,577

5 Claims. (Cl. 23—187)

This invention relates to strontium peroxide and to a method of producing the same. The general objects of the invention are to provide a method whereby the resultant strontium peroxide obtained will possess not only a very high degree of purity, but will also possess certain physical characteristics by which it is differentiated from strontium peroxide produced by the methods heretofore employed and which different physical characteristics impart certain definite advantages to the product of my method which are not possessed by the products of such prior methods.

As is well known to those skilled in the art to which this invention relates, strontium peroxide has been produced heretofore by two methods, one of which is known as the "dry method" and the other of which is known as the "wet method." The practice of the dry method consists in bringing strontium oxide (SrO) into direct union with oxygen under pressure in the presence of heat. However, this method has been subject to the objections: (1) that strontium peroxide made by this method contains some unconverted strontium oxide which renders the product unstable since it absorbs moisture and $CO_2$; and (2) that the non-volatile impurities are not only objectionable because they are present in undesirably high proportions, but they render the product incapable of flowing readily and hence objectionable when sought to be employed for certain purposes, such as the manufacture of incendiary and tracer compositions, flares, pyrotechnics, etc.

The wet method heretofore employed for the production of strontium peroxide has consisted in treating a water-soluble strontium compound (such as the hydrate, nitrate, etc.) with hydrogen peroxide. As thus produced, the strontium peroxide not only contains an undesirably high proportion of impurities (such as salts that cannot be washed out), but is also amorphous and in a very finely divided condition, being fluffy in its physical characteristics, whereby it is rendered incapable of flowing freely, thus seriously interfering with the operations of screening and the filling of shells and cartridges. Although light and fluffy in its physical characteristics, it nevertheless contains water, and all attempts to remove such water without decomposition have failed. The undesirable physical characteristics of strontium peroxide produced by the above wet process are due to the impurities therein, the principal impurities being moisture and strontium carbonate (the $CO_2$ content of which cannot be removed by heating) and/or salts that cannot be removed by washing.

By means of the method or process described hereinafter, I am enabled to produce anhydrous strontium peroxide possessing not only a high degree of purity (above 90% and as high as 96%) but also possessing a distinct crystalline formation whereby it has the capability of flowing comparable to that possessed by silica sand, and which requires no treatment, subsequent to its production, to enable it to pass freely through a #140 mesh sieve and to be poured into shells and cartridges.

The practice of my method consists of two chemical steps, the first step being the production of hydrated strontium peroxide, and the second chemical step consisting in the decomposition of the hydrated strontium peroxide into strontium peroxide and water. It is due to the employment of these two distinct chemical steps in the practice of my process that I am enabled to obtain a product having the high degree of purity and the desirable physical characteristics to which reference has been made hereinbefore.

The first chemical step of my method consists in reacting the pure crystallized hydrated strontium oxide with a 100 volume solution of hydrogen peroxide at a temperature of approximately 190° F., in the absence of $CO_2$. The "100 volume solution of hydrogen peroxide" represents a solution of about 33% of the peroxide to the solvent. As an illustration of the manner in which my method has been carried out, 50 pounds of pure crystallized hydrated strontium oxide and 26 pounds of 100 volume hydrogen peroxide are placed in an iron kettle, stirred and heated in an atmosphere devoid of $CO_2$ and at a temperature of approximately 190° F. which will result in violent ebullition of the batch with the evolution of oxygen and in precipitating hydrated strontium peroxide as an amorphous mass. In this condition, it is impossible to remove all of the water content therefrom by subsequent drying. By a subsequent treatment to which the batch is subjected, I am enabled to convert the amorphous powder into a sandy or crystalline meal which renders it suitable for the manufacture of satisfactory incendiary and tracer compositions, flares, pyrotechnics, etc. This subsequent treatment or second chemical step consists in continuing the ebullition and stirring after the formation of the aforesaid precipitate for an additional period of approximately twenty minutes and adding, during this interval, approximately 8 additional pounds of 100 volume hydrogen peroxide in portions of approximately ½ pound each and the time between successive additions being approximately the same throughout this period, it being important that continuous ebullition shall be maintained throughout the entire period during which hydrogen peroxide is utilized.

The entire batch is now transferred as promptly as possible to a suction filter box, the fluid portion drawn off rapidly and the residue transferred to a vacuum drier where the product is completely dried under 29 inches of vacuum and at from 212° F. to 230° F. and preferably not above 230° F., since by heating the same at a temperature above those mentioned, some oxygen may be driven off from the moist strontium peroxide, with a resultant reduction of the part of the latter thus deoxidized to strontium hydroxide. When the residue is not dried under vacuum, higher temperatures will be required for the drying operation and in such event the drying temperature should not exceed 260° F. in order to prevent driving off some of the oxygen from the moist strontium peroxide.

It is important that the two chemical steps and the drying step of the method or process shall be conducted in an atmosphere substantially free from $CO_2$, in order to prevent the possibility of producing strontium carbonate, which is the principal impurity in the strontium peroxide produced by any prior art wet method.

Strontium peroxide produced in accordance with the method described herein consists essentially of segregated crystals differing materially in size and shape from the crystals of which the strontium peroxides produced by the prior dry or direct method and the prior wet method are composed. The crystals produced by my method or process are tetrahedral and are greatly larger than the crystals of the strontium peroxides produced by these other methods or processes. There are the same comparable differences in size as those which exist between the particles of which silica sand is composed and the particles of which silica flour is composed; and, as the larger size of the particles of which silica sand is composed enables the latter to pour freely, whereas the smaller particles of which silica flour is composed prevent the same from flowing freely, without clogging, so the larger size of the crystals of which my strontium peroxide is composed enables it to flow freely while the smaller particles of which the strontium peroxides produced by the methods heretofore employed render these peroxides incapable of flowing freely, without clogging. The average of the areas of corresponding faces of the crystals produced in accordance with my method or process is not materially less than 25 square microns, which is greatly in excess of the average of the areas (1 to 3 square microns) of the like surfaces of the crystals of strontium peroxide produced by the prior art methods or processes.

It will be evident that, by the practice of the method or process described herein, I have obtained a new kind of strontium peroxide—one differing widely in both physical and chemical characteristics from the strontium peroxides that have been produced by the methods or processes heretofore employed in that it is non-hygroscopic and does not absorb $CO_2$ when exposed to atmospheric conditions. Its ability to remain stable under these conditions has rendered it invaluable in fields such as those set forth hereinbefore.

This application is a continuation in part of my application Serial No. 472,992, filed January 20, 1943.

Where the word "plurality" is employed in any claim hereof in connection with the number of portions of hydrogen peroxide that are added to the original mixture of hydrated strontium oxide and hydrogen peroxide, it is intended to cover the use of at least ten such additional portions.

Having thus described my invention, what I claim is:

1. The method or process of producing strontium peroxide which consists in heating, at a temperature below the boiling point of water and in an atmosphere devoid of $CO_2$, hydrated strontium oxide and hydrogen peroxide in proportions sufficient to produce hydrated strontium peroxide with the evolution of oxygen; adding thereafter to the resultant batch a plurality of at least ten successive additional substantially equal portions of hydrogen peroxide thereby to insure continuous evolution of oxygen from the said batch and to convert the hydrated strontium peroxide into crystalline strontium peroxide; and drying the resultant wet crystalline strontium peroxide at a temperature above 212° F. and below 260° F. and in an atmosphere devoid of $CO_2$.

2. The method or process of producing strontium peroxide which consists in heating, at a temperature below the boiling point of water and in an atmosphere devoid of $CO_2$, hydrated strontium oxide and hydrogen peroxide in proportions sufficient to produce hydrated strontium peroxide with the evolution of oxygen; adding thereafter to the resultant batch a plurality of at least ten successive additional substantially equal portions of hydrogen peroxide thereby to insure continuous evolution of oxygen from the said batch and to convert the hydrated strontium peroxide into crystalline strontium peroxide; and drying the resultant wet crystalline strontium peroxide under approximately 29 inches of vacuum and at temperatures of from approximately 212° F. to 230° F.

3. The method or process of producing strontium peroxide which consists in heating, at a temperature below the boiling point of water and stirring, during such heating, a mixture of pure crystalline hydrated strontium oxide and 100 volume hydrogen peroxide in the approximate proportions of 50 lbs. of the hydrated strontium oxide to 26 lbs. of the hydrogen peroxide until an amorphous hydrated strontium peroxide is produced with the evolution of oxygen throughout such reaction; continuing the heating and stirring operation for approximately twenty minutes thereafter and adding, throughout such period, approximately eight additional pounds of 100 volume hydrogen peroxide in successive portions of approximately ½ lb. each, and at substantially equally spaced intervals of time; removing fluid from the resultant material; and heating the resultant material in a vacuum drier under approximately 29 inches of vacuum and at temperatures of from approximately 212° F. to 230° F. in an atmosphere devoid of $CO_2$.

4. The method or process of producing strontium peroxide which consists in heating, at a temperature below the boiling point of water and in an atmosphere devoid of $CO_2$, hydrated strontium oxide and hydrogen peroxide in proportions sufficient to produce hydrated strontium peroxide with the evolution of oxygen; adding thereafter to the resultant batch a plurality of at least ten successive portions of hydrogen peroxide thereby to insure continuous evolution of oxygen from the said batch and to convert the hydrated strontium peroxide into crystalline strontium peroxide; removing fluid from the resultant crystalline strontium peroxide; and drying the resultant wet crystalline strontium peroxide at a temperature above 212° F. and below 260° F. and in an atmosphere devoid of $CO_2$.

5. The method or process of producing strontium peroxide which consists in heating, at a temperature below the boiling point of water and stirring, during such heating, a mixture of pure crystalline hydrated strontium oxide and 100 volume hydrogen peroxide in the approximate proportions of 50 lbs. of the hydrated strontium oxide to 26 lbs. of the hydrogen peroxide until an amorphous hydrated strontium peroxide is produced with evolution of oxygen throughout such reaction, continuing the heating and stirring operation for approximately twenty minutes thereafter and adding, throughout such period, approximately 8 lbs. of 100 volume hydrogen peroxide in successive increments whereby the evolution of oxygen will continue uninterruptedly, removing fluid from the resultant material and drying the said resultant material at a temperature of from approximately 212° F. to 230° F. in an atmosphere devoid of $CO_2$.

MAHLON J. RENTSCHLER.

REFERENCES CITED

The following references are of record in the file of this patent:

UNITED STATES PATENTS

| Number | Name | Date |
| --- | --- | --- |
| 2,357,655 | Hummel, et al | Sept. 5, 1944 |